US012688604B2

(12) United States Patent
Pejsa et al.

(10) Patent No.: US 12,688,604 B2
(45) Date of Patent: Jul. 21, 2026

(54) IDENTIFYING AN OBJECT FOR OBJECT RECOGNITION BASED ON A USER'S GAZE DETERMINED BY A HEADSET

(71) Applicant: Meta Platforms Technologies, LLC, Menlo Park, CA (US)

(72) Inventors: Tomislav Pejsa, San Jose, CA (US); Jing Huang, Redwood City, CA (US); Matthew Dan Feiszli, San Francisco, CA (US); Kevin J. Liang, Sunnyvale, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 162 days.

(21) Appl. No.: 18/522,694

(22) Filed: Nov. 29, 2023

(65) Prior Publication Data

US 2025/0173888 A1 May 29, 2025

(51) Int. Cl.
| | |
|---|---|
| G06T 7/70 | (2017.01) |
| G02B 27/01 | (2006.01) |
| G06F 3/01 | (2006.01) |

(52) U.S. Cl.
CPC .............. G06T 7/70 (2017.01); G02B 27/017 (2013.01); G06F 3/013 (2013.01)

(58) Field of Classification Search
CPC .......... G06T 7/70; G02B 27/017; G06F 3/013
See application file for complete search history.

(56) References Cited

U.S. PATENT DOCUMENTS

| | | | | |
|---|---|---|---|---|
| 11,783,553 | B2 * | 10/2023 | Friesenhahn | ......... G06T 19/003 |
| | | | | 345/633 |
| 2015/0070470 | A1 | 3/2015 | McMurrough | |
| 2019/0066283 | A1 * | 2/2019 | Gros | ......................... G06T 7/11 |
| 2021/0012161 | A1 * | 1/2021 | Linden | ................. G06V 10/776 |

OTHER PUBLICATIONS

Guan Y., et al., "Deepmix: Mobility-aware, Lightweight, and Hybrid 3D Object Detection for Headsets," Proceedings of the 20th Annual International Conference on Mobile Systems, Applications and Services, Jun. 27, 2022, pp. 28-41.
International Search Report and Written Opinion for International Application No. PCT/US2024/045002, mailed Dec. 10, 2024, 11 pages.

* cited by examiner

*Primary Examiner* — David F Dunphy
(74) *Attorney, Agent, or Firm* — Seyfarth Shaw LLP

(57) ABSTRACT
To register an object for subsequent identification by an artificial reality headset, the headset receives an input from a user to enter a registration mode. The headset includes a plurality of imaging devices capturing images of a local area surrounding the headset. An eye tracking unit of the headset determines a gaze direction of the user, and the headset identifies an object in the local area where the user's gaze is directed and visually distinguishes the identified object to the user. In response to receiving a confirmation from the user to register the identified object, one or more images of the identified object are captured by the imaging devices and used to train an instance classifier to identify the identified object. The headset notifies the user when the identified object has been registered.

20 Claims, 7 Drawing Sheets

Determine Gaze Direction of User
535

600

IDENTIFYING AN OBJECT FOR OBJECT RECOGNITION BASED ON A USER'S GAZE DETERMINED BY A HEADSET

FIELD OF THE INVENTION

This disclosure relates generally to artificial reality systems, and more specifically to object recognition within a local area for artificial reality systems.

BACKGROUND

Various devices, such as augmented reality (AR) headsets, implement one or more computer vision methods to detect or to recognize objects included in images. For example, an AR headset includes imaging devices capturing images of a local area around the AR headset and detects one or more objects in the local area from the images. Object recognition may be at a category level, where objects from a specific set of categories are detected, or at an instance level, where specific objects are detected based on training from a set of example images of a specific object. One or more object registration methods are used to train a device, such as an AR headset, to recognize specific object.

During conventional object registration, a user captures distinct images of an object from different angles and against different backgrounds. The captured images are used to train a model to identify or to detect the object in subsequent images. Capturing multiple images of an object from different angles or with other different characteristics is time consuming and has a high risk of errors occurring when the user captures the images. For example, during object registration, images of an object have specific requirements to be cropped around the object for segmenting the object from its background. This requires a user to precisely position an imaging device relative to the object to be registered, creating friction in the object registration process. Additionally, users often have to perform specific gestures to identify an object for registration, such as specifically pointing at an object or providing a sequence of other inputs to identify a specific object, increasing complexity of a user performing or initiating object registration.

SUMMARY

Instance level detection of objects allows detection of a specific object from images of an area. A headset, such as an augmented reality (AR) headset, may detect specific objects in images of a local area surrounding the headset captured by one or more imaging devices on the headset using instance level detection. Detecting specific objects in the local area allows tracking of different objects in the local area, while also allowing a headset to provide a user with information about different objects. To detect a specific object, a headset leverages gaze detection of a user to train an instance classifier for the specific object.

In various embodiments, the headset determines a gaze direction of the user within the local area from an eye tracking unit capturing data describing one or more of the user's eyes. For example, the eye tracking unit determines a gaze direction of the user from images of the user's eyes captured while the user's eyes are illuminated with a structured light pattern. The headset also captures images of the local area from one or more imaging devices and determines a location of the user's gaze direction in a three-dimensional model of the local area. Based on the location of the user's gaze direction in the three-dimensional model of the local area, the headset identifies an object and subsequently captures images of the identified object via the one or more imaging devices. An instance classifier is trained to detect the identified object based on the captured images of the identified object.

In various embodiments, a headset worn by a user receives an input from the user to register one or more objects in a local area surrounding the headset for subsequent detection. The headset determines a gaze direction of the user in the local area from captured information describing one or more of the user's eyes. Based on the determined gaze direction of the user, an object in the local area is identified. One or more imaging devices included on the headset and configured to capture images of the local area capture one or more images of the identified object. The captured one or more images are stored in association with a label corresponding to the identified object.

In some embodiments, a headset comprises one or more display elements coupled to a frame, with each display element configured to generate image light presented to a user. The headset also includes one or more imaging sensors coupled to the frame, with the one or more imaging sensors configured to capture images of a local area surrounding the frame. Additionally, the headset includes an eye tracking unit configured to determine a gaze direction of the user based on captured information describing one or more of the user's eyes. An object registration module included in the frame has a processor and a non-transitory computer-readable storage medium having instructions encoded thereon that, when executed by the processor, cause the processor to receive an input from the user to register one or more objects in the local area surrounding the headset for subsequent detection and to identify an object in the local area based on the determined gaze direction of the user. The instructions, when executed by the processor, also cause the processor to capture one or more images of the identified object from the one or more imaging devices and to store the captured one or more images in association with a label corresponding to the identified object.

Figure 1A:
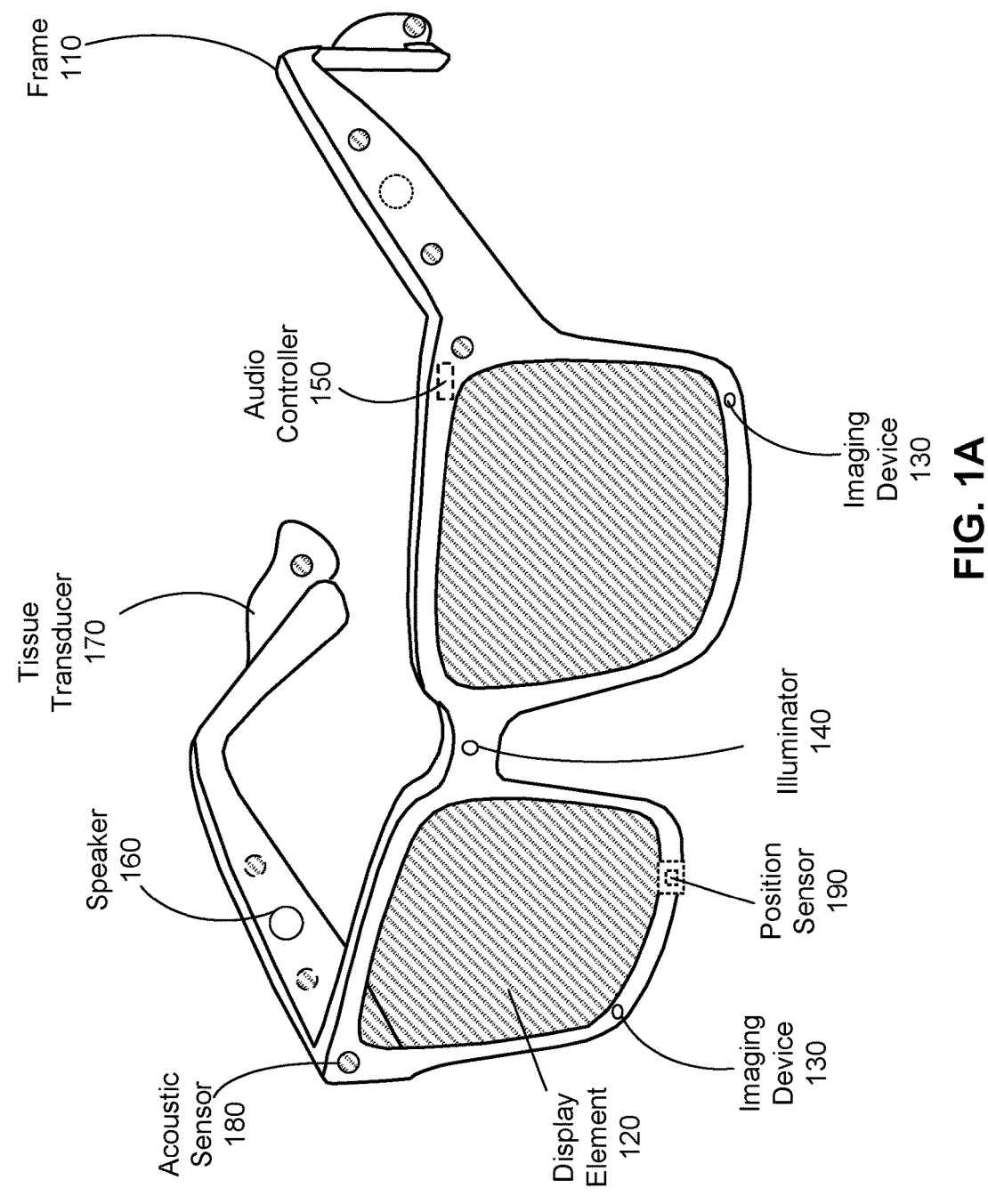
FIG. 1A is a perspective view of a headset implemented as an eyewear device, in accordance with one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Various devices, such as augmented reality (AR) headsets, implement one or more computer vision methods to detect objects included in images. Object recognition may include a category level that recognizes objects from a specific set of categories, an instance level that detects specific objects, or some combination thereof. Instance level detection of objects identifies a specific object from images of an area. A headset, such as an augmented reality (AR) headset, may leverage instance level detection of objects to detect specific objects from captured images of a local area surrounding the headset. Detecting specific objects in the local area allows the headset to track different objects in the local area and to provide a user with information about different objects in the local area.

To recognize a specific object through instance level detection, an instance classifier is trained through a training process where the specific object is registered. Leveraging a gaze direction of a user allows a headset to simplify registration of an object in a local area surrounding the headset for training the instance classifier. The headset determines a gaze direction of the user within the local area from an eye tracking unit capturing data describing one or more of the user's eyes. For example, the eye tracking unit determines a gaze direction of the user from images of the user's eyes captured while the user's eyes are illuminated with a structured light pattern. From a location of the user's gaze direction in the local area, the headset identifies an object corresponding to the location of the user's gaze direction in a three-dimensional model of the local area. For example, the headset identifies an object corresponding to a location in the three-dimensional model of the local area where the user's gaze direction remained for at least a threshold amount of time. Using one or more imaging devices capturing images of the local area, the headset captures images of the identified object. In various embodiments, different images of the identified object correspond to different positions of the identified object relative to one or more of the imaging devices. The captured images of the identified object are stored and used to train an instance classifier that subsequently detects the identified object from images of a local area.

With the trained instance classifier, the headset can recognize the specific object in subsequently captured image data. The headset, with one or more imaging devices, captures subsequent image data of the local area. The headset can apply the instance classifier to the subsequent image data to identify the registered object. In one or more embodiments, the headset first performs category-level object detection to the subsequent image data to identify objects in the subsequent image data. The headset may then apply the instance classifier to the identified objects to determine whether one of the identified objects in the local area is a registered object. Upon identifying a registered object, the headset may perform one or more actions with the registered object (e.g., providing one or more notifications in association with identifying the registered object).

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world)

content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to create content in an artificial reality and/or are otherwise used in an artificial reality. The artificial reality system that provides the artificial reality content may be implemented on various platforms, including a wearable device (e.g., headset) connected to a host computer system, a standalone wearable device (e.g., headset), a mobile device or computing system, or any other hardware platform capable of providing artificial reality content to one or more viewers.

FIG. 1A is a perspective view of a headset 100 implemented as an eyewear device, in accordance with one or more embodiments. In some embodiments, the eyewear device is a near eye display (NED). In general, the headset 100 may be worn on the face of a user such that content (e.g., media content) is presented using a display assembly and/or an audio system. However, the headset 100 may also be used such that media content is presented to a user in a different manner. Examples of media content presented by the headset 100 include one or more images, video, audio, or some combination thereof. The headset 100 includes a frame, and may include, among other components, a display assembly including one or more display elements 120, a depth camera assembly (DCA), an audio system, and a position sensor 190. While FIG. 1A illustrates the components of the headset 100 in example locations on the headset 100, the components may be located elsewhere on the headset 100, on a peripheral device paired with the headset 100, or some combination thereof. Similarly, there may be more or fewer components on the headset 100 than what is shown in FIG. 1A.

The frame 110 holds the other components of the headset 100. The frame 110 includes a front part that holds the one or more display elements 120 and end pieces (e.g., temples) to attach to a head of the user. The front part of the frame 110 bridges the top of a nose of the user. The length of the end pieces may be adjustable (e.g., adjustable temple length) to fit different users. The end pieces may also include a portion that curls behind the ear of the user (e.g., temple tip, ear piece).

The one or more display elements 120 provide light to a user wearing the headset 100. As illustrated the headset includes a display element 120 for each eye of a user. In some embodiments, a display element 120 generates image light that is provided to an eyebox of the headset 100. The eyebox is a location in space that an eye of user occupies while wearing the headset 100. For example, a display element 120 may be a waveguide display. A waveguide display includes a light source (e.g., a two-dimensional source, one or more line sources, one or more point sources, etc.) and one or more waveguides. Light from the light source is in-coupled into the one or more waveguides which outputs the light in a manner such that there is pupil replication in an eyebox of the headset 100. In-coupling and/or outcoupling of light from the one or more waveguides may be done using one or more diffraction gratings. In some embodiments, the waveguide display includes a scanning element (e.g., waveguide, mirror, etc.) that scans light from the light source as it is in-coupled into the one or more waveguides. Note that in some embodiments, one or both of the display elements 120 are opaque and do not transmit light from a local area around the headset 100. The local area is the area surrounding the headset 100. For example, the local area may be a room that a user wearing the headset 100 is inside, or the user wearing the headset 100 may be outside and the local area is an outside area. In this context, the headset 100 generates VR content. Alternatively, in some embodiments, one or both of the display elements 120 are at least partially transparent, such that light from the local area may be combined with light from the one or more display elements to produce AR and/or MR content.

In some embodiments, a display element 120 does not generate image light, and instead is a lens that transmits light from the local area to the eyebox. For example, one or both of the display elements 120 may be a lens without correction (non-prescription) or a prescription lens (e.g., single vision, bifocal and trifocal, or progressive) to help correct for defects in a user's eyesight. In some embodiments, the display element 120 may be polarized and/or tinted to protect the user's eyes from the sun.

In some embodiments, the display element 120 may include an additional optics block (not shown). The optics block may include one or more optical elements (e.g., lens, Fresnel lens, etc.) that direct light from the display element 120 to the eyebox. The optics block may, e.g., correct for aberrations in some or all of the image content, magnify some or all of the image, or some combination thereof.

The DCA determines depth information for a portion of a local area surrounding the headset 100. The DCA includes one or more imaging devices 130 and a DCA controller (not shown in FIG. 1A), and may also include an illuminator 140. In some embodiments, the illuminator 140 illuminates a portion of the local area with light. The light may be, e.g., structured light (e.g., dot pattern, bars, etc.) in the infrared (IR), IR flash for time-of-flight, etc. In some embodiments, the one or more imaging devices 130 capture images of the portion of the local area that include the light from the illuminator 140. As illustrated, FIG. 1A shows a single illuminator 140 and two imaging devices 130. In alternate embodiments, there is no illuminator 140 and at least two imaging devices 130.

The DCA controller computes depth information for the portion of the local area using the captured images and one or more depth determination techniques. The depth determination technique may be, e.g., direct time-of-flight (ToF) depth sensing, indirect ToF depth sensing, structured light, passive stereo analysis, active stereo analysis (uses texture added to the scene by light from the illuminator 140), some other technique to determine depth of a scene, or some combination thereof.

The DCA may include an eye tracking unit that determines eye tracking information. The eye tracking information may comprise information about a position and an orientation of one or both eyes (within their respective eye-boxes). The eye tracking unit may include one or more cameras. The eye tracking unit estimates an angular orientation of one or both eyes based on images captures of one or both eyes by the one or more cameras. In some embodiments, the eye tracking unit may also include one or more illuminators that illuminate one or both eyes with an illumination pattern (e.g., structured light, glints, etc.). The eye tracking unit may use the illumination pattern in the captured images to determine the eye tracking information. The headset 100 may prompt the user to opt in to allow operation of the eye tracking unit. For example, by opting in the headset 100 may detect, store, images of the user's any or eye tracking information of the user.

From information about position and orientation or one or both eyes of a user, the eye tracking unit determines a direction of a user's gaze. For example, the eye tracking unit determines a vector or a ray representing fixation of the user's gaze relative to a position of the user's head. In various embodiments, the eye tracking unit determines fixation of the user's gaze of each eye of the user based on position and orientation of each of the user's eyes. The eye tracking unit may employ various models or combinations of models to determine the direction of the user's gaze from position and orientation information about one or more of the user's eyes in various embodiments. As further described below in conjunction with FIGS. 3-5, an object registration module identifies an object in a local area based on a direction of the user's gaze and trains an instance classifier to detect the identified object.

Figure 2:
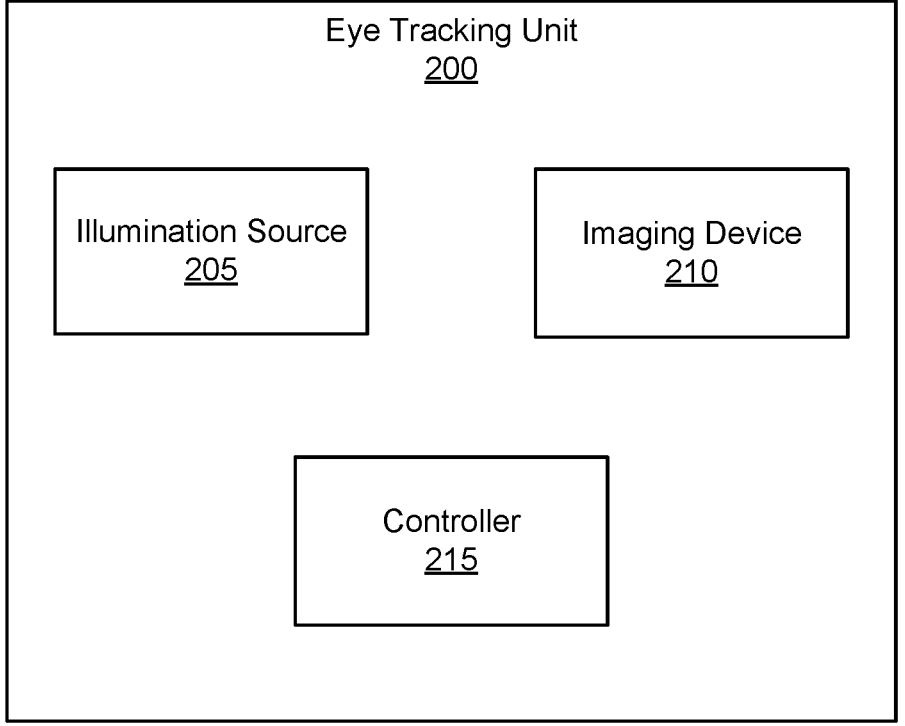
FIG. 2 is a block diagram of an eye tracking unit included in a headset, in accordance with one or more embodiments.

FIG. 2 shows a block diagram of one embodiment of an eye tracking unit 200 included in a headset 100. For example, the eye tracking unit 200 is included in a depth camera assembly (DCA), as further described above in conjunction with FIG. 1A. However, in other embodiments, the eye tracking unit 200 is a separate component than the DCA. In the example of FIG. 2, the eye tracking unit 200 includes an illumination source 205, one or more imaging devices 210, and a controller 215. However, in other embodiments, the eye tracking unit 200 includes different or additional components than those described in conjunction with FIG. 2. Further, in some embodiments, the functionality provided by multiple components shown in FIG. 2 may be combined into a single component.

The illumination source 205 emits light towards one or more of a user's eyes while the user wears a headset 100. In some embodiments, the eye tracking unit 200 includes an illumination source 205 for each of a user's eyes, so a different illumination source illuminates each of a user's eyes. Alternatively, a single illumination source 205 emits light towards both of a user's eyes. At least a portion of the light from the illumination source 205 illuminates a user's eye. Light emitted by the illumination source 205 may be structured light (e.g., dot pattern, bars, etc.) having infrared (IR) wavelengths, IR flash for time-of-flight, or have other characteristics. In various embodiments, light emitted by the illumination source 205 has wavelengths that are not visible to a user wearing the headset, such as infrared (IR) wavelengths.

The one or more imaging devices 210 capture images of one or more of the user's eyes. For example, a single imaging device 210 captures images of both of a user's eyes. As another example, two imaging devices 210 are included in the eye tracking unit 200, with different imaging devices 210 capturing images of a different eye of the user. As each of the user's eyes is illuminated by light from the illumination source 205, images of a user's eye are captured by an imaging device 210. The captured images include light from the illumination source 205 reflected by the user's eye.

The controller 215 determines a position and an orientation of one or both of the user's eyes while the user wears the headset 100 from images the one or more imaging devices 210 captured. From the position and the orientation of one or both of the user's eyes, the controller 215 determines a gaze direction of the user into the local area. The gaze direction indicates a location in the local area the user is looking. For example, the controller determines a distance between a center of a pupil of the eye and a reflection from the cornea of the eye for each of a user's eyes based on reflected light from the illumination source 205 included in images of a user's eye captured by an imaging device 210.

From the distance determined for each of the user's eyes, the controller 215 determines an angle of each of the user's eyes. From the angles of the user's eyes, the controller 215 determines a gaze direction of the user. For example, controller 215 determines the gaze direction of the user as a point in the local area where rays from a center of each eye of the user intersect and identifies a location in the local area where the user's gaze is directed as the point in the local area. In other embodiments, the controller 215 determines the gaze direction of the user through one or more other methods based on images of one or more of the user's eyes captured by the one or more imaging devices 210 including reflections of light emitted by the illumination source 205.

In various embodiments, the controller 215 determines a gaze direction of the user and a fixation point of the user's gaze. The controller 215 determines eye vergence and fixation depth along with gaze direction in such embodiments. The fixation depth identifies a depth of the location where the user's gaze is directed relative to a headset 100 worn by the user.

Referring back to FIG. 1A, the audio system provides audio content. The audio system includes a transducer array, a sensor array, and an audio controller 150. However, in other embodiments, the audio system may include different and/or additional components. Similarly, in some cases, functionality described with reference to the components of the audio system can be distributed among the components in a different manner than is described here. For example, some or all of the functions of the controller may be performed by a remote server.

The transducer array presents sound to a user. The transducer array includes a plurality of transducers. A transducer may be a speaker 160 or a tissue transducer 170 (e.g., a bone conduction transducer or a cartilage conduction transducer). Although the speakers 160 are shown exterior to the frame 110, the speakers 160 may be enclosed in the frame 110. In some embodiments, instead of individual speakers for each ear, the headset 100 includes a speaker array comprising multiple speakers integrated into the frame 110 to improve directionality of presented audio content. The tissue transducer 170 couples to the head of the user and directly vibrates tissue (e.g., bone or cartilage) of the user to generate sound. The number and/or locations of transducers may be different from what is shown in FIG. 1A.

The sensor array detects sounds within the local area of the headset 100. The sensor array includes a plurality of acoustic sensors 180. An acoustic sensor 180 captures sounds emitted from one or more sound sources in the local area (e.g., a room). Each acoustic sensor is configured to detect sound and convert the detected sound into an electronic format (analog or digital). The acoustic sensors 180 may be acoustic wave sensors, microphones, sound transducers, or similar sensors that are suitable for detecting sounds.

In some embodiments, one or more acoustic sensors 180 may be placed in an ear canal of each ear (e.g., acting as binaural microphones). In some embodiments, the acoustic sensors 180 may be placed on an exterior surface of the headset 100, placed on an interior surface of the headset 100, separate from the headset 100 (e.g., part of some other device), or some combination thereof. The number and/or locations of acoustic sensors 180 may be different from what is shown in FIG. 1A. For example, the number of acoustic detection locations may be increased to increase the amount of audio information collected and the sensitivity and/or accuracy of the information. The acoustic detection locations may be oriented such that the microphone is able to detect sounds in a wide range of directions surrounding the user wearing the headset 100.

The audio controller 150 processes information from the sensor array that describes sounds detected by the sensor array. The audio controller 150 may comprise a processor and a computer-readable storage medium. The audio controller 150 may be configured to generate direction of arrival (DOA) estimates, generate acoustic transfer functions (e.g., array transfer functions and/or head-related transfer functions), track the location of sound sources, form beams in the direction of sound sources, classify sound sources, generate sound filters for the speakers 160, or some combination thereof.

The position sensor 190 generates one or more measurement signals in response to motion of the headset 100. The position sensor 190 may be located on a portion of the frame 110 of the headset 100. The position sensor 190 may include an inertial measurement unit (IMU). Examples of position sensor 190 include: one or more accelerometers, one or more gyroscopes, one or more magnetometers, another suitable type of sensor that detects motion, a type of sensor used for error correction of the IMU, or some combination thereof. The position sensor 190 may be located external to the IMU, internal to the IMU, or some combination thereof.

In some embodiments, the headset 100 may provide for simultaneous localization and mapping (SLAM) for a position of the headset 100 and updating of a model of the local area. For example, the headset 100 may include a passive camera assembly (PCA) that generates color image data. The PCA may include one or more RGB cameras that capture images of some or all of the local area. In some embodiments, some or all of the imaging devices 130 of the DCA may also function as the PCA. The images captured by the PCA and the depth information determined by the DCA may be used to determine parameters of the local area, generate a model of the local area, update a model of the local area, or some combination thereof. Furthermore, the position sensor 190 tracks the position (e.g., location and pose) of the headset 100 within the room. Additional details regarding the components of the headset 100 are discussed below in connection with FIG. 6.

Figure 1B:
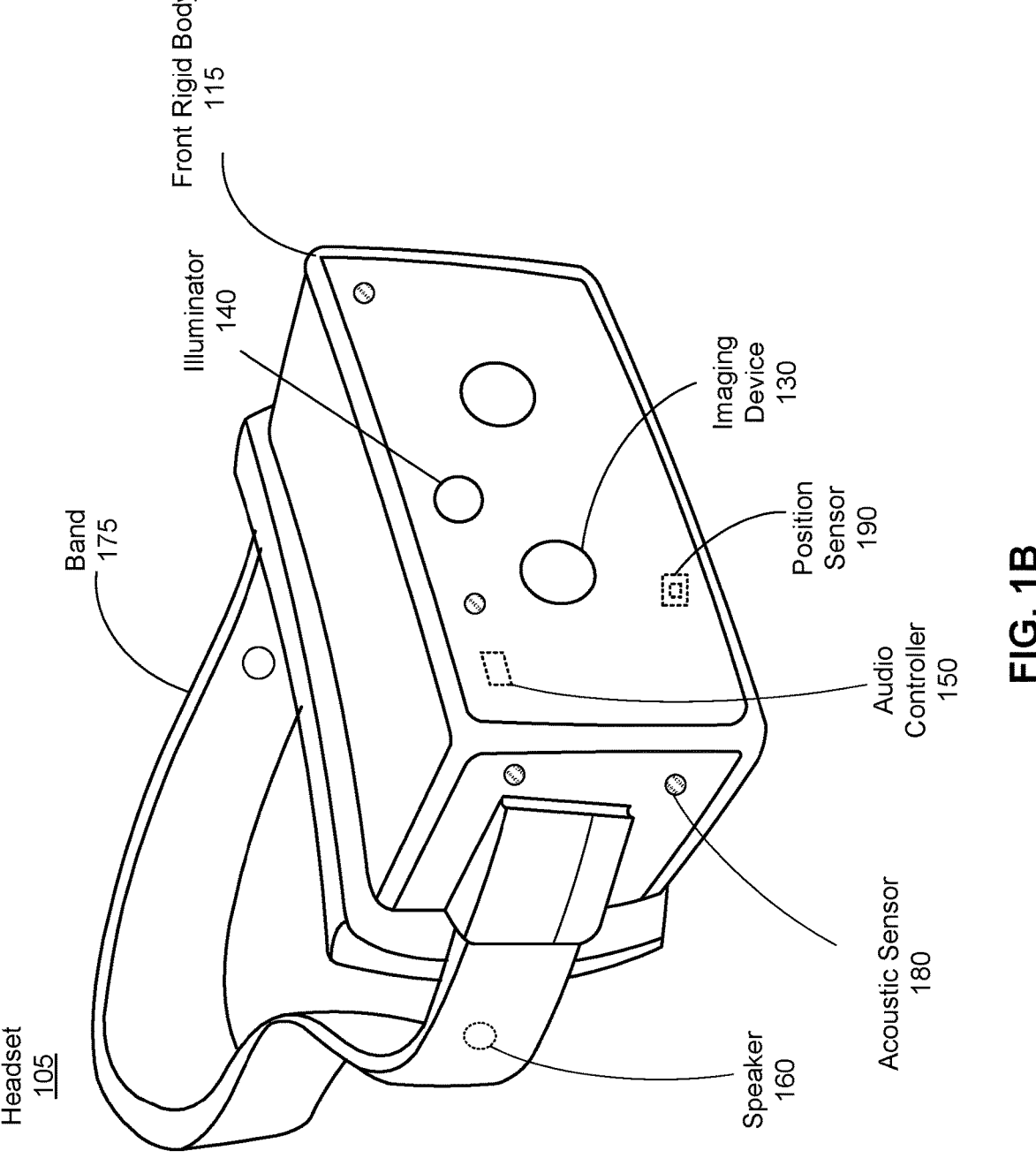
FIG. 1B is a perspective view of a headset implemented as a head-mounted display, in accordance with one or more embodiments.

FIG. 1B is a perspective view of a headset 105 implemented as a HMD, in accordance with one or more embodiments. In embodiments that describe an AR system and/or a MR system, portions of a front side of the HMD are at least partially transparent in the visible band (~380 nm to 750 nm), and portions of the HMD that are between the front side of the HMD and an eye of the user are at least partially transparent (e.g., a partially transparent electronic display). The HMD includes a front rigid body 115 and a band 175. The headset 105 includes many of the same components described above with reference to FIG. 1A, but modified to integrate with the HMD form factor. For example, the HMD includes a display assembly, a DCA, an audio system, and a position sensor 190. FIG. 1B shows the illuminator 140, a plurality of the speakers 160, a plurality of the imaging devices 130, a plurality of acoustic sensors 180, and the position sensor 190. The speakers 160 may be located in various locations, such as coupled to the band 175 (as shown), coupled to front rigid body 115, or may be configured to be inserted within the ear canal of a user.

Figure 3:
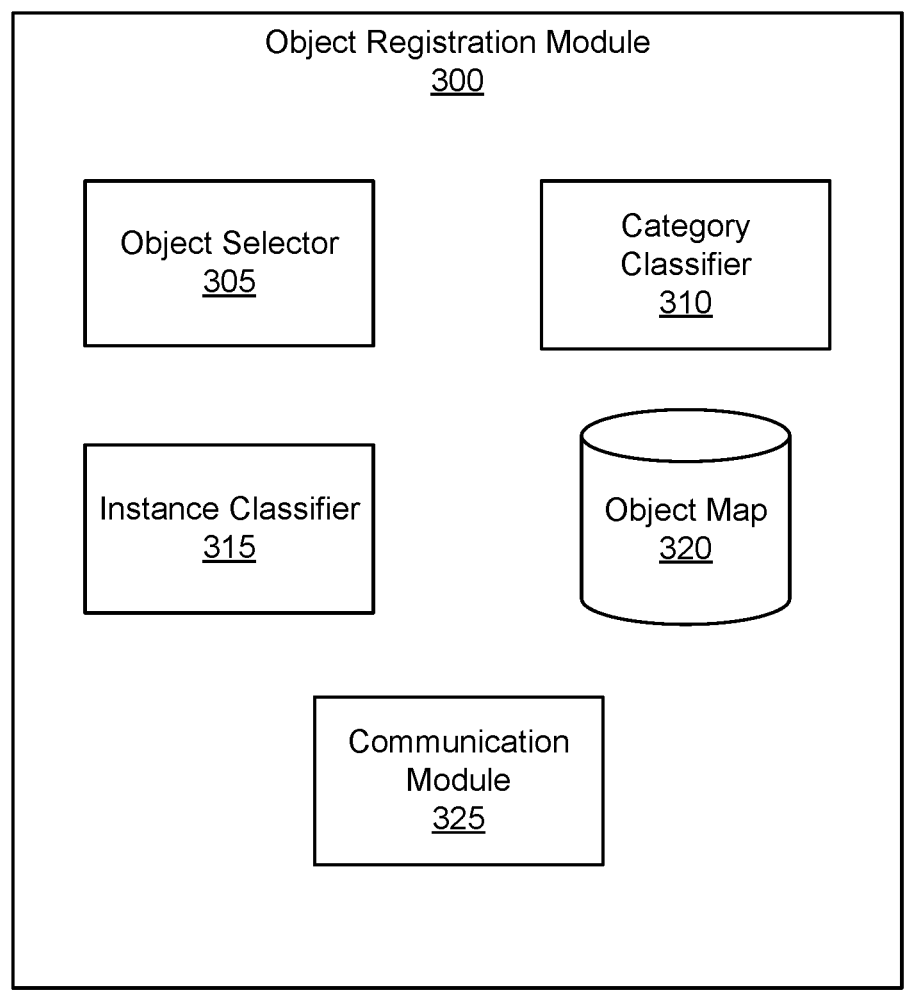
FIG. 3 is a block diagram of an object registration module, in accordance with one or more embodiments.

FIG. 3 is a block diagram of one embodiment of an object registration module 300. In various embodiments, the object registration module 300 is included in the headset 100. For example, the object registration module 300 is included in the frame 110 of a headset or is coupled to the frame 110 of the headset 100. In other embodiments, the object registration module 300 is physically separate from the frame 110 of the headset 100 and is communicatively coupled to one or more components of the frame 110. In the example of FIG. 3, the object registration module 300 includes an object selector 305, a category classifier 310, an instance classifier 315, an object map 320, and a communication module 325. In other embodiments, the object registration module 300 includes additional, different, or fewer components than those described in conjunction with FIG. 3.

Further, the object registration module 300 includes a processor and one or more non-transitory computer-readable storage media. The one or non-transitory computer-readable storage media have instructions encoded thereon that, when executed by the processor, cause the processor to provide the functionality further described below in conjunction with FIG. 3.

The object selector 305 receives a gaze direction of a user from an eye tracking unit 200 of a headset 100 and receives images of a local area surrounding the headset 100 from one or more imaging devices 130. Based on the gaze direction of the user, the object selector 305 identifies a location within a three-dimensional model of the local area generated from objects detected in the local area. The object selector 305 generates the three-dimensional model from depth information obtained from a depth camera assembly (DCA) or other depth sensors and objects that are detected by the category classifier 310 or by the instance classifier 315 in various embodiments. Further, each object in the three-dimensional model has a corresponding bounding box that specifies boundaries of the object. The bounding box for an object is aligned with one or more imaging devices 130 of the headset 100, providing a boundary of the object from the perspective of an imaging device 130. For example, the three-dimensional model includes a bounding box corresponding to each candidate object detected by the category classifier 310 in the local area from one or more images.

Based on candidate objects identified in the images of the local area identified by the category classifier 310, the object selector 305 identifies a region of the three-dimensional model of the local area including a candidate object and including the location where the user's gaze is directed as an object. In various embodiments, the object selector 305 identifies a bounding box within the three-dimensional model of the local area with which a ray corresponding to the gaze direction of the user intersects, and identifies an object corresponding to the identified bounding box In various embodiments, the object selector 305 receives identifiers of candidate objects within the local area and regions of images of the local area corresponding to candidate objects from the category classifier 310 and maps the identifiers of the candidate objects to regions within the three dimensional model of the local area. Based on the location within the three dimensional model of the local area where a ray corresponding to the location where the user's gaze is directed, the object selector 305 identifies a candidate object corresponding to a bounding box within the three-dimensional model where the user's gaze was directed. For example, the object selector 305 identifies a candidate object corresponding to a bounding box included in a region of the three-dimensional model of the local area where the ray corresponding to user's gaze was directed for at least a threshold amount of time. In some embodiments, if the ray in the three dimensional model of the local area intersects multiple bounding boxes each corresponding to a candidate object, the object selector 305 selects a candidate object corresponding to a bounding box that is nearest to the user.

In some embodiments, the eye tracking unit 200 determines a gaze direction of the user and a fixation point of the user's gaze. The eye tracking unit 200 determines eye vergence and fixation depth along with gaze direction in such embodiments. The fixation depth identifies a depth of the location where the user's gaze is directed relative to a headset 100 worn by the user. The object selector 305 receives the fixation point of the user's gaze and selects an object based on the fixation point and direction of the user's gaze. For example, the object selector 305 selects a candidate object corresponding to a bounding box corresponding to a region in the three-dimensional model of the local area nearest to a fixation point of the user's gaze. Alternatively, the object selector 305 selects a candidate object corresponding to bounding box that a ray corresponding to the user's gaze direction intersects and that is nearest to the headset in the three-dimensional model of the local area.

Alternatively, the object selector 305 determines a ray corresponding to the gaze direction of the user from the eye tracking unit 200 and projects the ray into a two-dimensional location within an image of the local area captured by an imaging device 130. The object selector 305 selects an object from the image of the local area detected by the category classifier 310 where the ray corresponding to the gaze direction of the user intersects (e.g., an object corresponding to a bounding box in the image of the local area intersected by the ray corresponding to the gaze direction of the user). For example, the object selector 305 identifies a candidate object corresponding to a bounding box included in an image of the local area intersected by the ray corresponding to user's gaze for at least a threshold amount of time.

The object selector 305 identifies a candidate object based on a gaze direction of a user in response to receiving an input from the user in various embodiments. The received input indicates the user is registering an object for subsequent detection by the instance classifier 315. For example, the object selector 305 receives the input in response to an acoustic sensor 180 of the headset 100 capturing audio from the user, such as capturing a specific word or phrase. As another example, the object selector 305 receives the input from a controller or other device coupled to the headset, with the user interacting with the controller or the other device. In another example, the object selector 305 receives the input in response to an imaging device 130 of the headset capturing a specific gesture or movement from the user. One or more display elements 120 of the headset 100 may display one or more interface elements with which the user interacts, so the object selector 305 receives the input in response to interactions by the user with one or more of the interface elements.

Additionally, the object selector 305 displays one or more prompts to the user in response to identifying an object based on the gaze direction of the user. For example, the object selector 305 communicates a prompt to one or more display elements 120 of the headset 100, which displays the prompt to the user. In some embodiments, the prompt visually distinguishes the object identified based on gaze direction of the user from other objects in the local area. For example, the prompt is an icon or text displayed by a display element 120 of the headset 100 proximate to the object selected based on the user's gaze direction. As another example, the prompt is a boundary displayed by the display element 120 surrounding the identified object. Alternatively or additionally, the object selector 305 communicates a prompt to one or more speakers 160 of the headset 100, which play the prompt to the user. The prompt may be a message to reposition the identified object relative to one or more imaging devices 130, so different images of the identified object reflect different relative positions of the object to one or more of the imaging devices 130. For example, the prompt displays a direction for the user to move an imaging device 130 relative to the identified object to capture images from different relative positions of the imaging device 130 to the identified object. The prompt may display an indication or other signal when an image of the identified object from a specific orientation of the identified object relative to an imaging device 130 is captured. Further, the object selector 305 may transmit a message to the user via the one or more display elements 120 or to one or more speakers 160 in response to storing one or more images of the identified object or in response to training the instance classifier 315 for the identified object.

In various embodiments, the object selector 305 modifies a captured image of an identified object to remove portions of the image outside of a region including the identified object (e.g., removing portions of the image outside of a bounding box including the identified object) and stores the modified image in association with a label corresponding to the identified object provided by the user. For example, the object selector 305 modifies an images of the identified object that was captured after the object was identified by the user. Images associated with the identified object by the object selector 305 are subsequently retrieved to train the instance classifier 315, as further described below.

The category classifier 310 is a trained model that, when applied to one or more images of the local area received from the one or more imaging devices 130, identifies any objects in the one or more images. In various embodiments, the category classifier 310 is a trained region based convolutional neural network (R-CNN). Based on characteristics of different regions of an image of the local area, the category classifier 310 identifies regions of the image including an object having a category, or type. The category classifier 310 does not identify a specific object from an image, but identifies regions of the image including an object having one or more categories, or types, for which the category classifier 310 was trained. For example, the category classifier 310 identifies regions in an image including an object having a category of "cup," as a candidate object, but does not differentiate between different objects having the category of "cup" in the image. Hence, the category classifier 310 identifies regions within an image of the local area likely to include an object based on one or more categories of objects.

For each region within an image identified as a candidate object, the category classifier 310 also specifies dimensions of the candidate object for a region. In various embodiments, the category classifier 310 determines a bounding box for a candidate object, so that the region of an image corresponding to the candidate object is enclosed in the bounding box. The category classifier 310 determines dimensions of the bounding box for each candidate object based on characteristics of the candidate object, so different candidate objects may be surrounded by bounding boxes with different dimensions. Additionally, the category classifier 310 determines dimensions of bounding boxes without user input in various embodiments, simplifying identification of regions of an image corresponding to candidate objects. In various embodiments, the category classifier 310 identifies coordinates within an image of bounding boxes for each candidate object detected in the image and associates a candidate object identifier with each bounding box to identify different candidate objects.

The instance classifier 315 is a trained model that detects a specific object in images from the imaging devices. To detect the specific object, the specific object is initially registered with the instance classifier 315 in response to being identified by the object selector 305. The instance classifier 315 detects the specific identified object rather than a category of objects, so the instance classifier 315 discriminates between different objects having a common category. In various embodiments, the instance classifier 315 is a machine learning model comprising a set of weights. These weights are parameters used by the machine learning model to transform input data received by the model into output data. For the instance classifier, input data comprises one or more images of an object and an output is a label applied to the object, with the label identifying the object to the user. The weights may be generated through a training process, whereby the machine learning model is trained based on a set of training examples and labels associated with the training examples. In various embodiments, the training process includes: applying the machine learning model to a training example, comparing an output of the machine learning model to the label associated with the training example, and updating weights associated for the machine learning model through a back-propagation process. The weights may be stored on one or more computer-readable media to comprise the instance classifier. The training examples are images of the identified object captured by the one or more imaging devices 130 by the object selector 305. In some embodiments, the instance classifier 315 may build a three dimensional model of the identified object based on the images of the identified objects, while in other embodiments the instance classifier 315 detects the identified object from images of the local area. Subsequently, the instance classifier 315 receives one or more images and detects the object in one or more images. Hence, the instance classifier 315 allows a specific object to be detected in images, while the category classifier 310 identifies a type or a category of an object included in one or more images. In one or more embodiments, instance classifier 315 is refined with subsequent image captured of a previously registered object.

In various embodiments, the object map 320 stores information in the three-dimensional model of the local area to identify an object identified by the object selector 305. For example, the object map 320 stores a label corresponding to an identified object in association with a location within the three dimensional model of the local area corresponding to the identified object and dimensions of the identified object (e.g., a bounding box corresponding to the identified object). The object map 320 may further track positions of identified objects relative to the local area. For example, the object map 320 updates the three dimensional model of the local area to identify positions of one or more objects previously identified by the object selector 305 in the three dimensional model of the local area, allowing the object map 320 to update the three dimensional model of the local area to identify a position of an identified object relative to the headset 100 in the three dimensional model of the local area.

The communication module 325 links the object registration module 300 to one or more other components of the headset 100 or to other devices, such as a mapping server 625 or a console 615 further described below in conjunction with FIG. 6. In various embodiments, the communication module 325 couples the object registration module 300 to one or more components through a network. The communication module 325 may use wired communication protocols, wireless communication protocols, or a combination of wireless and wired transmission protocols to exchange data with components of the headset 100 or with other components in various embodiments.

During deployment of the object registration module 300, the instance classifier 315 can be used to identify registered objects in subsequently captured image data. For example, the headset (e.g., the headset 100 or the headset 105 of FIGS. 1A & 1B), with one or more imaging devices (e.g., the imaging device 130), captures subsequent image data of the local area. The headset can apply the instance classifier 315 to the subsequent image data to identify the registered object.

In one or more embodiments, the headset first applies the category classifier 310 to the subsequent image data to identify objects in the subsequent image data. The category classifier 310 may also classify identified objects into one or more categories from a plurality of categories of objects. The headset may then apply the instance classifier 315 to the identified objects to determine whether one of the identified objects in the local area is a registered object. In some embodiments, the instance classifier 315 can be applied to all identified objects. In other embodiments, the instance classifier 315 can be applied to identified objects in a subset of categories. For example, the object registration module 300 may register many distinct mugs in a user's home. The object registration module 300 may train a plurality of instance classifiers 315, each trained to recognize one of the registered mugs. During deployment, the object registration module 300 may apply the category classifier 310 which identifies mugs (generally) in the local area. Then the object registration module 300 may apply the instance classifiers 315 to the identified mugs to identify each individual registered mug.

Upon identifying a registered object, the headset may perform one or more actions with the registered object. One example action includes tracking a location of the identified object in the local area. As the registered object is identified in subsequent image data, the headset may track the registered object by recording its location relative to the local area. For example, if the user of the headset prompts the headset to remind the user of the location of the registered object, then the headset can provide a notification of the last-seen location of the registered object. In another example, the headset prompts the user to replace a registered object based on information about the registered object (e.g., medication, toothbrush, sponge, etc.) and a time when the registered object was initially registered. In another example, the headset retrieves information about a registered object, such as other objects similar to the registered object or information (e.g., price, location) about other objects that are similar to the registered object. Another example action includes providing one or more notifications when the registered object is identified in the subsequent image data. In a first example, the headset may display a label or a tag in proximity to the registered object. In a second example, the headset may categorize objects, e.g., a category of recognized objects may be "plants." The headset upon identification of a specific plant that is registered may provide a notification to water the plant.

Figure 4:
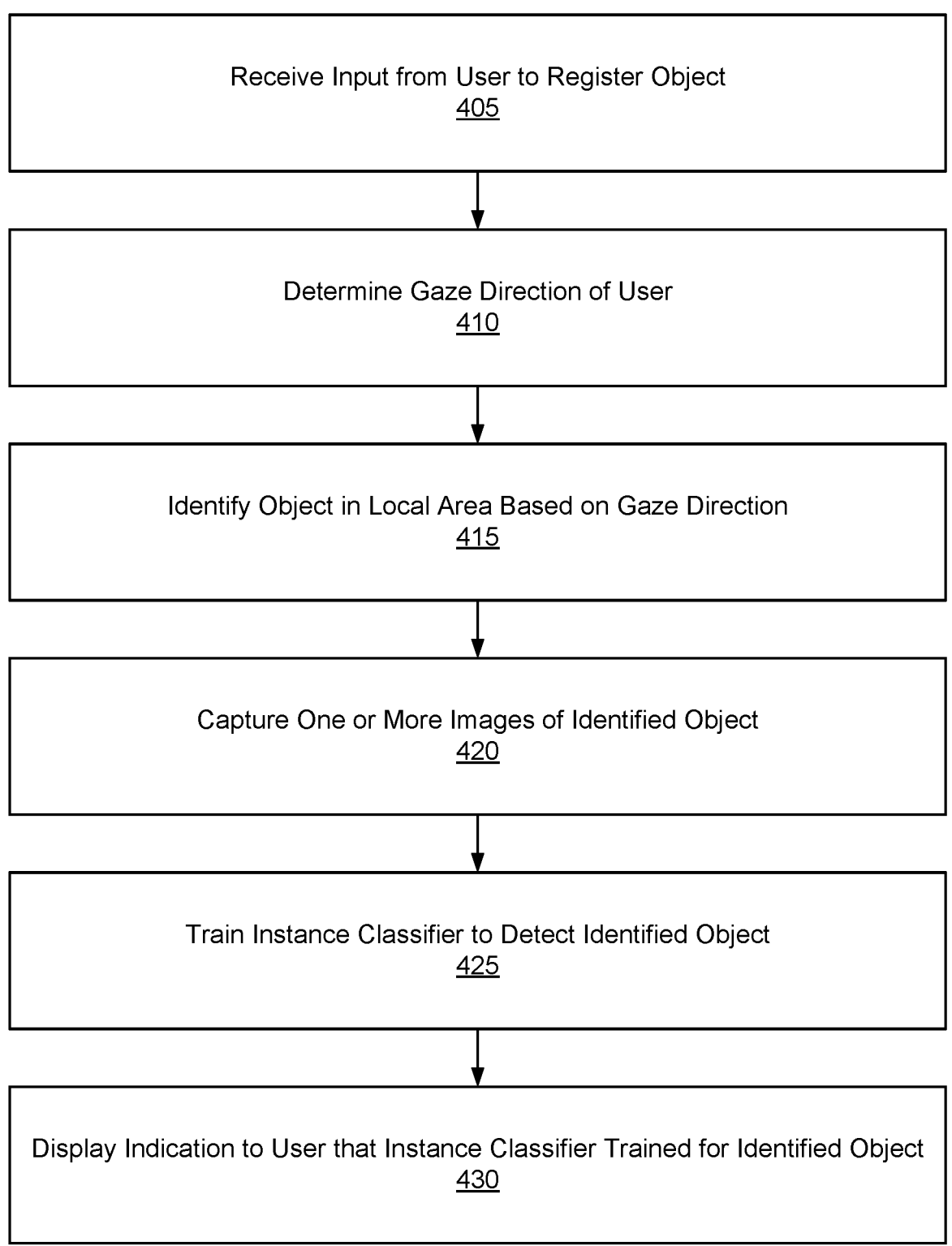
FIG. 4 is a flowchart illustrating a method for registering an object for recognition by a headset, in accordance with one or more embodiments.

FIG. 4 is a flowchart of a method for registering an object for recognition by a headset 100, in accordance with one or more embodiments. The process shown in FIG. 4 may be performed by components of an object detection system (e.g., object registration module 300). Other entities may perform some or all of the steps in FIG. 4 in other embodiments. Embodiments may include different or additional steps, or perform the steps in different orders.

A headset 100, as further described above in conjunction with FIGS. 1A and 1B, receives 405 an input from a user to register an object in a local area surrounding the headset 100. In some embodiments, the headset 100 receives 405 the input by capturing a specific audio phrase or sound from the user through one or more acoustic sensors 180. As another example, the headset 100 receives 405 the input when a specific gesture or movement of a portion of the user's body is captured by one or more imaging devices 130 configured to capture images of the local area surrounding the headset 100. In other embodiments, the headset 100 receives 305 the input from the user through other actions performed by the user (e.g., physically contacting a portion of the headset 100, etc.).

In response to receiving 405 the input from the user, the headset 100 operates in an object registration mode. In the object registration mode, the headset 100 captures data (e.g., image data) used to subsequently detect an object identified by the user while the headset operates in the object registration mode. As further described above in conjunction with FIGS. 1A and 2, the headset 100 includes an eye tracking unit 200 that determines a position and an orientation of one or both of the user's eyes while the user wears the headset 100. From the position and the orientation of one or both of the user's eyes, the eye tracking unit 200 determines 310 a gaze direction of the user into the local area. For example, the eye tracking unit 200 captures a distance between a center of a pupil of the eye and a reflection from the cornea of the eye for each of a user's eyes and determines an angle of each of the user's eyes from the captured distance for each of the user's eyes. From the angles of the user's eyes, the eye tracking unit 200 determines 310 the gaze direction of the user. For example, the gaze direction of the user is a location in the local area where rays from a center of each eye of the user intersect when the user's eyes have the determined angles. In various embodiments, the eye tracking unit 200 determines a gaze direction of the user and a fixation point of the user's gaze. The eye tracking unit 200 determines eye vergence and fixation depth along with gaze direction in such embodiments. The fixation depth identifies a depth of the location where the user's gaze is directed relative to a headset 100 worn by the user.

Additionally, the headset 100 includes one or more imaging devices 130 that are each configured to capture images of a local area surrounding the headset 100, as further described above in conjunction with FIG. 1. Images captured by the one or more imaging devices 130 may include one or more objects that are in the local area surrounding the headset 100. The headset 100 detects objects in one or more of the captured images. For example, a category classifier 310 is applied to captured images to detect candidate objects in the one or more images, as further described above in conjunction with FIG. 3. In some embodiments, the category classifier 310 is included in the headset 100, such as in the object registration module 300 further described above in conjunction with FIG. 3. Alternatively, the headset 100 communicates images captured by the one or more imaging devices 130 to a server, such as a mapping server 625, or to a console 615, as further described below in conjunction with FIG. 6, and the server or the console 615 applies the category classifier 310 to the captured images. In the preceding example, the server or the console 615 transmits objects detected by the category classifier 310 to the headset 100. As further described above in conjunction with FIG. 3, regions of an image identified by the category classifier 310 are candidate objects, as those regions include one or more objects that the category classifier 310 was trained to identify. In some embodiments, the category classifier 310 also outputs a classification for each candidate object that identifies a type of the candidate object. Application of the category classifier 310 identifies regions within an image of the local area that include an object in one or more categories, enabling differentiation of candidate objects in one or more images from a background of the one or more images.

In various embodiments, the category classifier 310 determines a bounding box for each candidate object detected by the category classifier. A bounding box for a candidate object specifies a boundary of the region of the image including the candidate object, so a region of the image within the bounding box including the candidate object, while regions of the image outside of the bounding box are not the candidate object. The category classifier 310 determines dimensions of a bounding box for each candidate object based on characteristics of the region of the image including the candidate object, so different candidate objects may be surrounded by bounding boxes having different dimensions. Further, in some embodiments, the category classifier 310 determines dimensions of a bounding box for a candidate object without receiving an input or an interaction from the user, simplifying identification of regions of an image including an object. In various embodiments, the category classifier 310 identifies coordinates within an image of bounding boxes for each candidate object detected in the image and associates a unique candidate object identifier with each bounding box. The candidate object identifier allows the headset 100 to subsequently identify different regions in the image including a candidate object.

Based on the gaze direction determined 410 for the user and the candidate objects determined in the local area, the headset 100 identifies 415 an object in the local area. In various embodiments, the object registration module 300 of the headset 100 identifies 415 the object as a candidate object in a region in a three-dimensional model of the local area corresponding to a location where the gaze of the user is directed. For example, the identified object is an object included in a bounding box in the three-dimensional model of the local area intersected by a ray corresponding to the gaze direction of the user. In various embodiments, the headset 100 accounts for a fixation depth of the user's gaze as well as the gaze direction of the user to identify 415 an object. For example, the headset identifies 415 an object corresponding to a bounding box in the three-dimensional model of the local area intersected by the ray corresponding to the gaze direction of the user and within a threshold distance of the fixation depth of the user's gaze. In other embodiments, the headset 100 identifies 415 the object as a candidate object in a region of an image corresponding to a location where the gaze of the user is directed in the local area. For example, the identified object is an object included in a bounding box that also includes a location of the gaze direction of the user. In the preceding example, the headset 100 identifies 415 an object included in a bounding box with which the gaze direction of the user intersects. In some embodiments, the object registration module 300 identifies 415 a candidate object included in a bounding box corresponding to a location where the user's gaze was directed for at least a threshold amount of time. In other embodiments, the object registration module 300 identifies 415 a candidate object that is closest to the user's gaze. This allows identification of an object in the local area based on a direction of the user's gaze in the local area, simplifying identification of the object by the user.

In various embodiments, the headset 100 visually distinguishes the identified object from other candidate objects in the local area and from the background of the local area. For example, the headset 100 overlays the bounding box including the identified object on the identified object via a display element 120 to show a boundary of the identified object to the user, while the display element 120 does not show bounding boxes surrounding other objects in the local area. As another example, the headset 100 overlays a specific color or shading over the identified object via the display element 120. In another example, the headset 100 displays an icon, image, or text proximate to the identified object via a display element 120 to differentiate the identified object from other objects in the local area. By visually distinguishing the identified object from other portions of the local area, the headset 100 indicates to the user which object in the local area has been identified 415.

In response to identifying 415 the identified object, the imaging devices 130 of the headset 100 capture 420 one or more images of the identified object. In some embodiments, the headset 100 prompts the user to change a relative position of the identified object to one or more of the imaging devices 130 to capture different images of the identified object. For example, the headset 100 displays instructions to the user via one or more display elements 120 to modify a position of the identified object from a current position or to modify a position of an imaging device 130 relative to the identified object, and the imaging device 130 captures 420 one or more images of the identified object with the modified position relative to the imaging device 130. Modifying the position of the identified object relative to the one or more imaging devices 130 allows different images to include different perspectives of the identified object, providing additional information about characteristics of the identified object. The object registration module 300 stores the captured images.

In various embodiments, the headset 100 receives a label from the user for the identified object and stores the label in association with each of the captured images of the identified object. The headset 100 may receive the label for the identified object from the user after the object was identified 415 and before the one or more images of the object were captured 420. Alternatively, the headset 100 receives the label for the identified object after the object was identified 415 and after the one or more images of the object were captured 420. Receiving the label for the identified object from the user allows the user to provide a name or other identifier to more easily remember or identify the identified object.

The object registration module 300 modifies one or more of the captured images to more clearly include the identified object in various embodiments. For example, the object registration module 300 modifies a captured image of the identified object by removing portions of the image outside the bounding box corresponding to the identified image. In various embodiments, when modifying the captured image, a bounding box corresponding to the identified object in the three dimensional model of the local area surrounding the headset is mapped to the captured image using a view matrix and a projection matrix of the imaging device 130 capturing the image, allowing the captured image to be cropped based on dimensions of the bounding box for the identified object in the three dimensional model of the local area. The object registration module 300 stores the modified image in association with the label for the identified object. Modifying a captured image allows the object registration module 300 to remove portions of a captured image that are not relevant to the identified object.

Using the one or more captured images of the identified object, the headset 100 trains 425 an instance classifier 315 to detect the identified object in subsequently captured images. In various embodiments, the instance classifier 315 is a machine learning model comprising a set of weights. These weights are parameters used by the machine learning model to transform input data received by the model into output data. For the instance classifier 315, input data comprises one or more images of an object and an output is a label applied to the object. The weights may be generated through a training process, whereby the machine learning model is trained based on a set of training examples and labels associated with the training examples. The training examples used by the object registration module 300 are the captured images of the identified object stored in association with the label for the identified object, with the label for the identified object comprising the label for a training example. In various embodiments, the training process includes: applying the machine learning model to a training example, comparing an output of the machine learning model to the label associated with the training example, and updating weights associated for the machine learning model through a back-propagation process. The weights may be stored on one or more computer-readable media to comprise the instance classifier. Subsequently, the instance classifier 315 receives one or more images and outputs a region within an image that includes the identified object. Hence, the instance classifier 315 allows detection of a specific object from images, while the category classifier 310 identifies regions including a category of object included in one or more images without differentiating between different objects in a common category. This allows the instance classifier 315 to detect a specific object from images of the local area captured by the imaging device 130, allowing the headset 100 to track the specific object or to identify the specific object in the local area.

In various embodiments, the headset 100 displays 430 an indication to the user that the instance classifier 315 has been trained based on the captured images of the identified object. For example, the headset 100 displays 430 a prompt or a message to the user via one or more display elements 120 including text or images confirming the instance classifier 315 is capable of detecting the identified object. The prompt or message may be displayed proximate to the identified object or displayed in a particular location of a display element 120 in various embodiments. As another example, the headset 100 displays 430 a particular color or pattern overlaid on the identified object by display element 120 to indicate the instance classifier 315 has been trained. In other embodiments, the headset 100 displays 430 the indication in response to storing the one or more captured images of the identified object. Alternatively, the prompt or message is an audio signal played by one or more speakers 160, is a haptic signal causing movement of one or more portions of a frame 110 of the headset, or presented to the user via the headset 100 in another manner.

Figure 5:
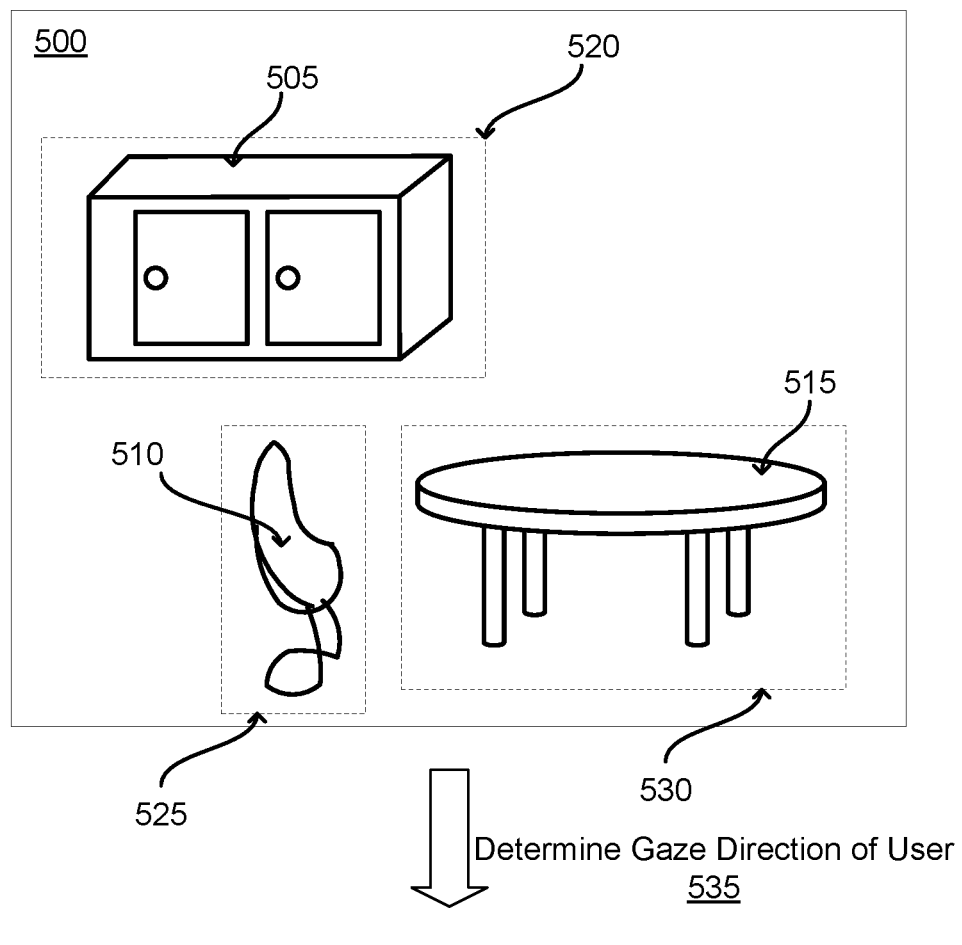
FIG. 5 is an example of a headset registering an object for recognition from images of a local area, in accordance with one or more embodiments.
Figure 5:
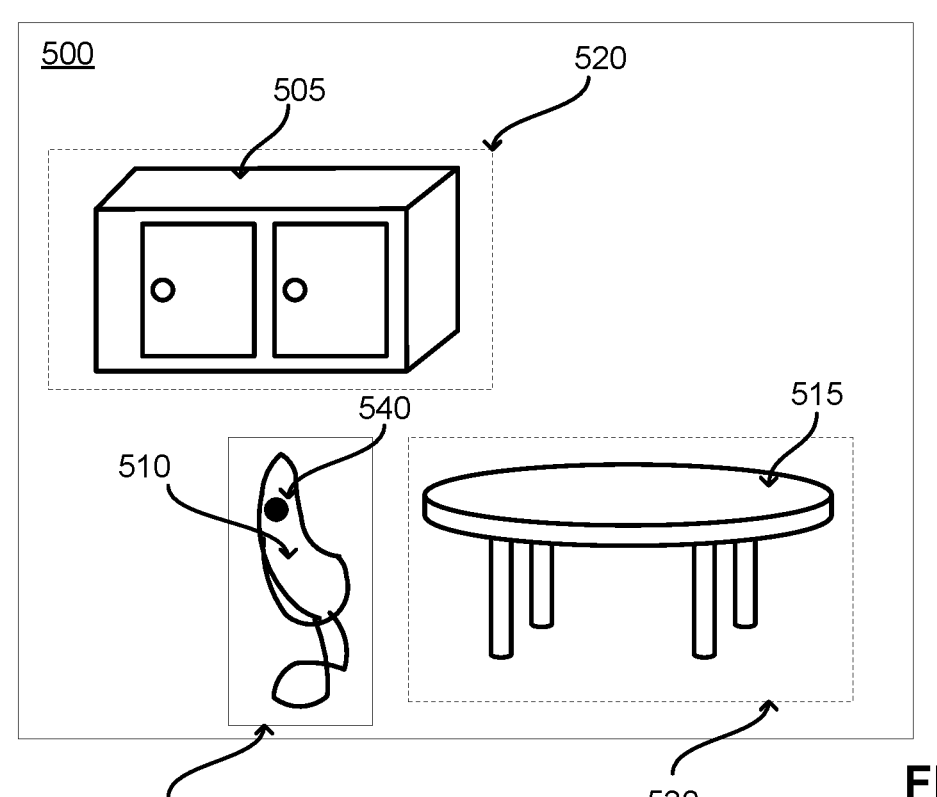

FIG. 5 is an example of a headset 100 registering an object for detection, in accordance with one or more embodiments. FIG. 5 shows an example local area 500 surrounding a headset 100. The local area 500 includes object 505, object 510, and object 515 in the example of FIG. 5. However, in other embodiments, the local area 500 includes a different number of objects. Each of the objects is within a field of view of one or more imaging devices 130 of the headset that are positioned to capture images of the local area 500.

As further described above in conjunction with FIGS. 3 and 4, the headset 100 (or a computing device communicatively coupled to the headset 100) applies a category classifier 310 to images of the local area 500 captured by the one or more imaging devices 130. The category classifier 310 identifies regions within images of the local area 500 including candidate objects. The category classifier 310 identifies regions of an image of the local area including one or more objects having one or more categories the category classifier 310 was trained to identify, so each region of the image of the local area 500 corresponds to a candidate object. In various embodiments, the category classifier 310 also identifies a category or a type of each candidate object identified within the local area 500.

In the example of FIG. 5, the category classifier 310 determines a bounding box for each detected candidate object. A bounding box for a candidate object specifies a boundary of the region of the image including the candidate object, with a region of the image within the bounding box including the candidate object and regions of the image outside of the bounding box not being the candidate object. In the example of FIG. 5, the category classifier determines bounding box 520 corresponding to object 505, bounding box 525 corresponding to object 510, and bounding box 530 corresponding to object 515. In some embodiments, the headset 100 displays the bounding boxes 520, 525, 530 via a display element 120 to the user to identify candidate objects identified in the local area 500. In other embodiments, the headset 100 does not display the bounding boxes 520, 525, 530, but stores coordinates in an image of the local area 500 corresponding to each bounding box 520, 525, 530.

Additionally, the headset 100 determines 535 a gaze direction of the user, as further described above in conjunction with FIGS. 2 and 4. The gaze direction of the user indicates a location in the local area where the gaze of the user is directed. In various embodiments, the headset 100 includes an eye tracking unit 200 that determines 535 the gaze direction of the user from captured images of the user's eyes while the user wears the headset 100, as further described above in conjunction with FIG. 2.

The headset 100, such as an object registration module 300, compares the gaze direction of the user within the local area 500 to bounding boxes of candidate objects identified in the image of the local area 500. In response to determining the gaze direction of the user is within a region of the local area 500 corresponding to a candidate object, the headset 100 identifies the candidate object. For example, the headset 100 identifies an object as a candidate object in response to determining a location of the user's gaze direction in the local area corresponds to a bounding box including the candidate object in an image of the local area 500. The headset 100 identifies an object within a bounding box including the location where the user's gaze is directed for at least a threshold amount of time in some embodiments. In the example of FIG. 5, the headset 100 determines 535 location 540 for the user's gaze direction. As location 540 is within bounding box 525, the headset 100 identifies object 510, which is included in bounding box 525. In some embodiments, the headset 100 identifies object 510 in response to the location 540 of the user's gaze direction being within bounding box 525 for at least a threshold amount of time.

As further described above in conjunction with FIG. 4, in response to identifying object 510, one or more imaging devices 130 of the headset 100 capture one or more images of object 510. The headset 100 stores the captured images of the identified object and trains an instance classifier 315 to detect object 510 from images of the local area 500. The instance classifier allows object 510 to be specifically detected from images of the local area 500, allowing differentiation of object 510 from other objects in the local area 500 having a common category as object 510. As further described above in conjunction with FIG. 4, in various embodiments, the headset 100 prompts the user to capture images of object 510 from different orientations relative to the imaging devices 130, so different images capture different perspectives of object 510 to improve an accuracy with which the identified object, object 510, is detected in images of the local area 500.

Identifying an object based on a user's gaze direction simplifies identification of the object to the headset 100 by reducing complexity of input from the user. As the headset 100, or a device coupled to the headset 100, identifies regions within images of the local area 500 corresponding to candidate objects and determines dimensions of bounding boxes for different candidate objects, no inputs are received from the user to adjust or to crop images of the local area 500 to identify an object. This reduction in number and complexity of inputs received from the user simplifies identification of an object by the user, which increases a likelihood of the user identifying objects for subsequent user interaction, allowing the headset 100 to provide the user with increased functionality.

Figure 6:
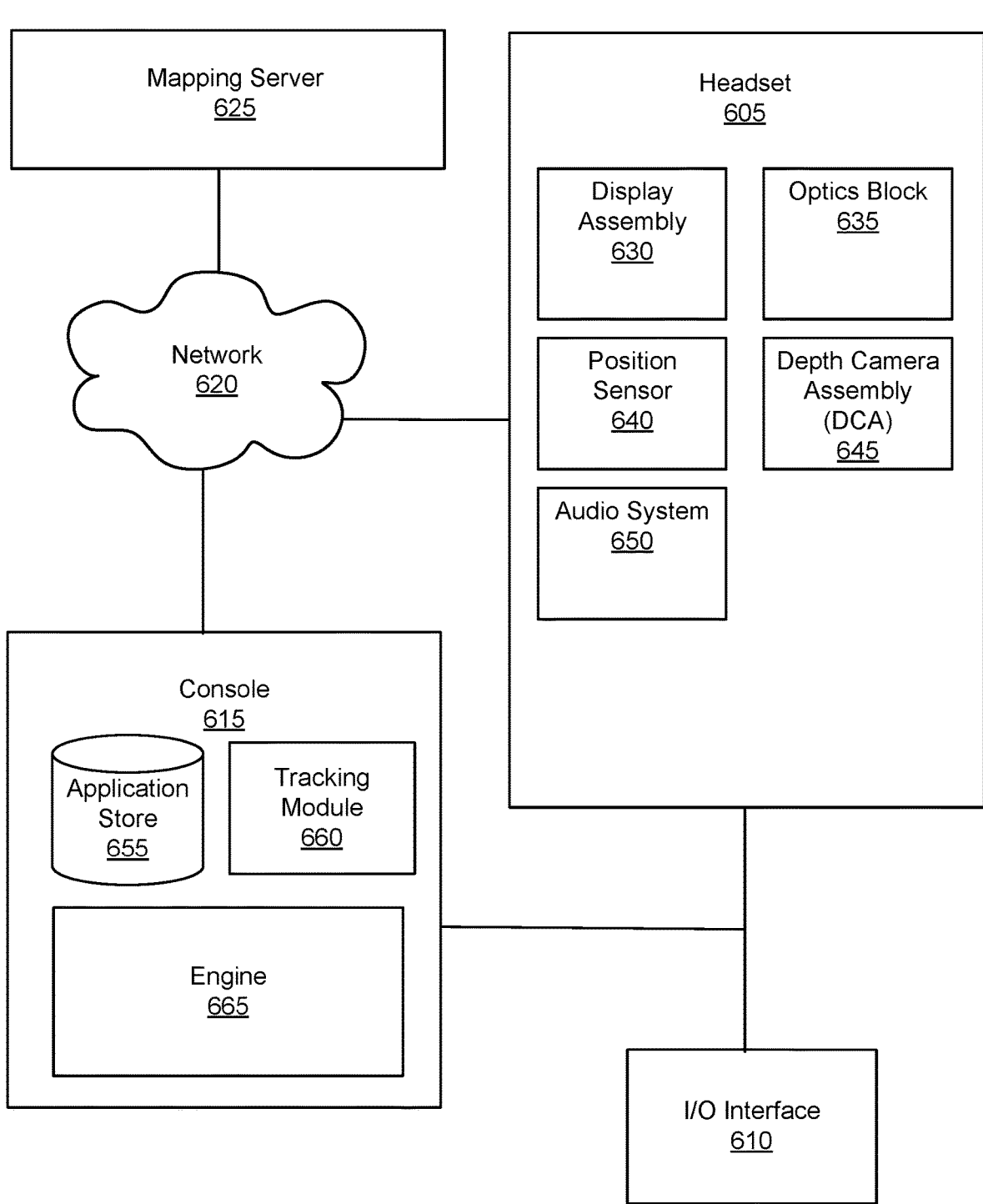
FIG. 6 is a system that includes a headset, in accordance with one or more embodiments.

FIG. 6 is a system 600 that includes a headset 605, in accordance with one or more embodiments. In some embodiments, the headset 605 may be the headset 100 of FIG. 1A or the headset 105 of FIG. 1B. The system 600 may operate in an artificial reality environment (e.g., a virtual reality environment, an augmented reality environment, a mixed reality environment, or some combination thereof). The system 600 shown by FIG. 6 includes the headset 605, an input/output (I/O) interface 610 that is coupled to a console 615, the network 620, and the mapping server 625. While FIG. 6 shows an example system 600 including one headset 605 and one I/O interface 610, in other embodiments any number of these components may be included in the system 600. For example, there may be multiple headsets each having an associated I/O interface 610, with each headset and I/O interface 610 communicating with the console 615. In alternative configurations, different and/or additional components may be included in the system 600. Additionally, functionality described in conjunction with one or more of the components shown in FIG. 6 may be distributed among the components in a different manner than described in conjunction with FIG. 6 in some embodiments. For example, some or all of the functionality of the console 615 may be provided by the headset 605.

The headset 605 includes the display assembly 630, an optics block 635, one or more position sensors 640, and the DCA 645. Some embodiments of headset 605 have different components than those described in conjunction with FIG. 6. Additionally, the functionality provided by various components described in conjunction with FIG. 6 may be differently distributed among the components of the headset 605 in other embodiments, or be captured in separate assemblies remote from the headset 605.

The display assembly 630 displays content to the user in accordance with data received from the console 615. The display assembly 630 displays the content using one or more display elements (e.g., the display elements 120). A display element may be, e.g., an electronic display. In various embodiments, the display assembly 630 comprises a single display element or multiple display elements (e.g., a display for each eye of a user). Examples of an electronic display include: a liquid crystal display (LCD), an organic light emitting diode (OLED) display, an active-matrix organic light-emitting diode display (AMOLED), a waveguide display, some other display, or some combination thereof. Note in some embodiments, the display element 120 may also include some or all of the functionality of the optics block 635.

The optics block 635 may magnify image light received from the electronic display, corrects optical errors associated with the image light, and presents the corrected image light to one or both eyeboxes of the headset 605. In various embodiments, the optics block 635 includes one or more optical elements. Example optical elements included in the optics block 635 include: an aperture, a Fresnel lens, a convex lens, a concave lens, a filter, a reflecting surface, or any other suitable optical element that affects image light. Moreover, the optics block 635 may include combinations of different optical elements. In some embodiments, one or more of the optical elements in the optics block 635 may have one or more coatings, such as partially reflective or anti-reflective coatings.

Magnification and focusing of the image light by the optics block 635 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases, all of the user's field of view. Additionally, in some embodiments, the amount of magnification may be adjusted by adding or removing optical elements.

In some embodiments, the optics block 635 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 635 corrects the distortion when it receives image light from the electronic display generated based on the content.

The position sensor 640 is an electronic device that generates data indicating a position of the headset 605. The position sensor 640 generates one or more measurement signals in response to motion of the headset 605. The position sensor 190 is an embodiment of the position sensor 640. Examples of a position sensor 640 include: one or more IMUs, one or more accelerometers, one or more gyroscopes, one or more magnetometers, another suitable type of sensor that detects motion, or some combination thereof. The position sensor 640 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the headset 605 from the sampled data. For example, the IMU integrates the measurement signals received from the accelerometers over time to estimate a velocity vector and integrates the velocity vector over time to determine an estimated position of a reference point on the headset 605. The reference point is a point that may be used to describe the position of the headset 605. While the reference point may generally be defined as a point in space, however, in practice the reference point is defined as a point within the headset 605.

The DCA 645 generates depth information for a portion of the local area. The DCA includes one or more imaging devices and a DCA controller. The DCA 645 may also include an illuminator. Operation and structure of the DCA 645 is described above with regard to FIG. 1A. In various embodiments, the DCA 645 includes an object registration module 300, as further described above in conjunction with FIGS. 3-5 that identifies an object in a local area surrounding the headset 605 based on a gaze direction of a user and trains an instance classifier to subsequently detect the identified object based on images of the local area.

The audio system 650 provides audio content to a user of the headset 605. The audio system 650 may comprise one or acoustic sensors, one or more transducers, and an audio controller. The audio system 650 may provide spatialized audio content to the user. In some embodiments, the audio system 650 may request acoustic parameters from the mapping server 625 over the network 620. The acoustic parameters describe one or more acoustic properties (e.g., room impulse response, a reverberation time, a reverberation level, etc.) of the local area. The audio system 650 may provide information describing at least a portion of the local area from e.g., the DCA 645 and/or location information for the headset 605 from the position sensor 640. The audio system 650 may generate one or more sound filters using one or more of the acoustic parameters received from the mapping server 625 and use the sound filters to provide audio content to the user.

The I/O interface 610 is a device that allows a user to send action requests and receive responses from the console 615. An action request is a request to perform a particular action. For example, an action request may be an instruction to start or end capture of image or video data, or an instruction to perform a particular action within an application. The I/O interface 610 may include one or more input devices. Example input devices include: a keyboard, a mouse, a game controller, or any other suitable device for receiving action requests and communicating the action requests to the console 615. An action request received by the I/O interface 610 is communicated to the console 615, which performs an action corresponding to the action request. In some embodiments, the I/O interface 610 includes an IMU that captures calibration data indicating an estimated position of the I/O interface 610 relative to an initial position of the I/O interface 610. In some embodiments, the I/O interface 610 may provide haptic feedback to the user in accordance with instructions received from the console 615. For example, haptic feedback is provided when an action request is received, or the console 615 communicates instructions to the I/O interface 610 causing the I/O interface 610 to generate haptic feedback when the console 615 performs an action.

The console 615 provides content to the headset 605 for processing in accordance with information received from one or more of: the DCA 645, the headset 605, and the I/O interface 610. In the example shown in FIG. 6, the console 615 includes an application store 655, a tracking module 660, and an engine 665. Some embodiments of the console 615 have different modules or components than those described in conjunction with FIG. 6. Similarly, the functions further described below may be distributed among components of the console 615 in a different manner than described in conjunction with FIG. 6. In some embodiments, the functionality discussed herein with respect to the console 615 may be implemented in the headset 605, or a remote system.

The application store 655 stores one or more applications for execution by the console 615. An application is a group of instructions, that when executed by a processor, generates content for presentation to the user. Content generated by an application may be in response to inputs received from the user via movement of the headset 605 or the I/O interface 610. Examples of applications include: gaming applications, conferencing applications, video playback applications, or other suitable applications.

The tracking module 660 tracks movements of the headset 605 or of the I/O interface 610 using information from the DCA 645, the one or more position sensors 640, or some combination thereof. For example, the tracking module 660 determines a position of a reference point of the headset 605 in a mapping of a local area based on information from the headset 605. The tracking module 660 may also determine positions of an object or virtual object. Additionally, in some embodiments, the tracking module 660 may use portions of data indicating a position of the headset 605 from the position sensor 640 as well as representations of the local area from the DCA 645 to predict a future location of the headset 605. The tracking module 660 provides the estimated or predicted future position of the headset 605 or the I/O interface 610 to the engine 665.

The engine 665 executes applications and receives position information, acceleration information, velocity information, predicted future positions, or some combination thereof, of the headset 605 from the tracking module 660. Based on the received information, the engine 665 determines content to provide to the headset 605 for presentation to the user. For example, if the received information indicates that the user has looked to the left, the engine 665 generates content for the headset 605 that mirrors the user's movement in a virtual local area or in a local area augmenting the local area with additional content. Additionally, the engine 665 performs an action within an application executing on the console 615 in response to an action request received from the I/O interface 610 and provides feedback to the user that the action was performed. The provided feedback may be visual or audible feedback via the headset 605 or haptic feedback via the I/O interface 610.

The network 620 couples the headset 605 and/or the console 615 to the mapping server 625. The network 620 may include any combination of local area and/or wide area networks using both wireless and/or wired communication systems. For example, the network 620 may include the Internet, as well as mobile telephone networks. In one embodiment, the network 620 uses standard communications technologies and/or protocols. Hence, the network 620 may include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 620 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 620 can be represented using technologies and/or formats including image data in binary form (e.g., Portable Network Graphics (PNG)), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc.

The mapping server 625 may include a database that stores a virtual model describing a plurality of spaces, wherein one location in the virtual model corresponds to a current configuration of a local area of the headset 605. The mapping server 625 receives, from the headset 605 via the network 620, information describing at least a portion of the local area and/or location information for the local area. The user may adjust privacy settings to allow or prevent the headset 605 from transmitting information to the mapping server 625. The mapping server 625 determines, based on the received information and/or location information, a location in the virtual model that is associated with the local area of the headset 605. The mapping server 625 determines (e.g., retrieves) one or more acoustic parameters associated with the local area, based in part on the determined location in the virtual model and any acoustic parameters associated with the determined location. The mapping server 625 may transmit the location of the local area and any values of acoustic parameters associated with the local area to the headset 605.

One or more components of system 600 may contain a privacy module that stores one or more privacy settings for user data elements. The user data elements describe the user or the headset 605. For example, the user data elements may describe a physical characteristic of the user, an action performed by the user, a location of the user of the headset 605, a location of the headset 605, an HRTF for the user, etc. Privacy settings (or "access settings") for a user data element may be stored in any suitable manner, such as, for example, in association with the user data element, in an index on an authorization server, in another suitable manner, or any suitable combination thereof.

A privacy setting for a user data element specifies how the user data element (or particular information associated with the user data element) can be accessed, stored, or otherwise used (e.g., viewed, shared, modified, copied, executed, surfaced, or identified). In some embodiments, the privacy settings for a user data element may specify a "blocked list" of entities that may not access certain information associated with the user data element. The privacy settings associated with the user data element may specify any suitable granularity of permitted access or denial of access. For example, some entities may have permission to see that a specific user data element exists, some entities may have permission to view the content of the specific user data element, and some entities may have permission to modify the specific user data element. The privacy settings may allow the user to allow other entities to access or store user data elements for a finite period of time.

The privacy settings may allow a user to specify one or more geographic locations from which user data elements can be accessed. Access or denial of access to the user data elements may depend on the geographic location of an entity who is attempting to access the user data elements. For example, the user may allow access to a user data element and specify that the user data element is accessible to an entity only while the user is in a particular location. If the user leaves the particular location, the user data element may no longer be accessible to the entity. As another example, the user may specify that a user data element is accessible only to entities within a threshold distance from the user, such as another user of a headset within the same local area as the user. If the user subsequently changes location, the entity with access to the user data element may lose access, while a new group of entities may gain access as they come within the threshold distance of the user.

The system 600 may include one or more authorization/privacy servers for enforcing privacy settings. A request from an entity for a particular user data element may identify the entity associated with the request and the user data element may be sent only to the entity if the authorization server determines that the entity is authorized to access the user data element based on the privacy settings associated with the user data element. If the requesting entity is not authorized to access the user data element, the authorization server may prevent the requested user data element from being retrieved or may prevent the requested user data element from being sent to the entity. Although this disclosure describes enforcing privacy settings in a particular manner, this disclosure contemplates enforcing privacy settings in any suitable manner.

Additional Configuration Information

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer-readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer-readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   receiving, at a headset worn by a user, an input from the user to register objects in a local area surrounding the headset for subsequent detection;
   determining, by the headset, a gaze direction of the user in the local area based on captured information describing eyes of the user;
   identifying an object in the local area based on the determined gaze direction of the user;
   capturing images of the identified object from one or more imaging devices included in the headset and configured to capture images of the local area;
   storing the captured images of the identified object in association with a label corresponding to the identified object;
   determining, by the headset without input from the user, a first bounding box comprising captured images of the objects in the local area; and
   determining the identified object included in the first bounding box that comprises a location of the gaze direction of the user.

2. The method of claim 1, wherein identifying the object in the local area based on the determined gaze direction of the user comprises:
   identifying one or more regions of the images of the local area captured by the one or more imaging devices as candidate objects;
   identifying regions in a three-dimensional model of the local area corresponding to the candidate objects; and
   identifying the object corresponding to a candidate object within a region in the three-dimensional model of the local area to which the gaze direction of the user is directed.

3. The method of claim 2, wherein identifying the object corresponding to a candidate object within a region in the three-dimensional model of the local area to which the gaze direction of the user is directed comprises:
   determining, by the headset without input from the user, a second bounding box corresponding to the candidate objects in the three-dimensional model of the local area; and
   identifying a candidate object included in the second bounding box that comprises a location of the gaze direction of the user.

4. The method of claim 3, wherein identifying the candidate object included in the bounding box that comprises the location of the gaze direction of the user comprises:
   identifying the candidate object included in second bounding box comprising the location of the gaze direction of the user for at least a threshold amount of time.

5. The method of claim 2, wherein identifying one or more regions of images of the local area captured by the one or more imaging devices as candidate objects comprises:

applying a category classifier to the images of the local area, the category classifier identifying regions of the image comprising at least one object.

6. The method of claim 1, further comprising:
   receiving the label corresponding to the identified object from the user after capturing the images of the identified object.

7. The method of claim 1, further comprising:
   receiving the label corresponding to the identified object from the user after identifying the object and before capturing the images of the identified object.

8. The method of claim 1, wherein capturing the images of the identified object from the imaging devices included in the headset and configured to capture the images of the local area comprises:
   capturing a plurality of images of the identified object, the plurality of images corresponding to a different position of the identified object relative to the imaging devices.

9. The method of claim 1, further comprising:
   training an instance classifier to detect the identified object within the images of the local area based on the captured images of the identified object.

10. The method of claim 9, further comprising:
   displaying an indication to the user that the instance classifier has been trained via a display element of the headset.

11. A headset comprising:
   a frame;
   one or more display elements coupled to the frame, the one or more display elements configured to generate image light for presentation to a user;
   one or more imaging devices coupled to the frame, the one or more imaging devices configured to capture images of a local area surrounding the frame;
   an eye tracking unit configured to determine a gaze direction of the user based on captured information describing eyes of the user; and
   an object registration module comprising a processor and a non-transitory computer-readable storage medium having instructions encoded thereon that, when executed by the processor, cause the headset to:
      receive an input from the user to register objects in the local area surrounding the headset for subsequent detection;
      identify an object in the local area based on the determined gaze direction of the user;
      capture images of the identified object from the one or more imaging devices;
      store the captured images of the identified object in association with a label corresponding to the identified object;
      determine without input from the user, a first bounding box comprising captured images of the objects in the local area; and
      determine the identified object included in the first bounding box that comprises a location of the gaze direction of the user.

12. The headset of claim 11, wherein identify the object in the local area based on the determined gaze direction of the user comprises:
   identify one or more regions of the images of the local area captured by the one or more imaging devices as candidate objects;
   identify regions in a three-dimensional model of the local area corresponding to the candidate objects; and identify the object corresponding to a candidate object within a region in the three-dimensional model of the local area to which the gaze direction of the user is directed.

13. The headset of claim 12, wherein identify the object corresponding to a candidate object within a region in the three-dimensional model of the local area to which the gaze direction of the user is directed comprises:

determine, by the headset without input from the user, a second bounding box corresponding to the candidate objects in the three-dimensional model of the local area; and identify a candidate object included in the second bounding box that comprises a location of the gaze direction of the user.

14. The headset of claim 13, wherein identify the candidate object included in the bounding box that comprises the location of the gaze direction of the user comprises:

identify a candidate object included in the second bounding box
comprising the location of the gaze direction of the user for at least a threshold amount of time.

15. The headset of claim 12, wherein identify one or more regions of images of the local area captured by the one or more imaging devices as candidate objects comprises:

apply a category classifier to the images of the local area, the category classifier identifying regions of the image comprising at least one object.

16. The headset of claim 11, wherein when the one or more processors further execute the instructions, the headset is configured to:

receive the label corresponding to the identified object from the user after capturing the images of the identified object.

17. The headset of claim 11, wherein when the one or more processors further execute the instructions, the headset is configured to:

receive the label corresponding to the identified object from the user after identifying the object and before capturing the images of the identified object.

18. The headset of claim 11, wherein capture the images of the identified object from the one or more imaging devices included in the headset and configured to capture the images of the local area comprises:

capture a plurality of images of the identified object, each image of the plurality of images corresponding to a different position of the identified object relative to the one or more imaging devices.

19. A non-transitory computer-readable medium storing instructions that, when executed, cause:

receiving, at a headset worn by a user, an input from the user to register objects in a local area surrounding the headset for subsequent detection;

determining, by the headset, a gaze direction of the user in the local area based on captured information describing eyes of the user;

identifying an object in the local area based on the determined gaze direction of the user;

capturing images of the identified object from one or more imaging devices included in the headset and configured to capture images of the local area;

storing the captured images of the identified object in association with a label corresponding to the identified object;

determining, by the headset without input from the user, a first bounding box comprising captured images of the objects in the local area; and determining the identified object included in the first bounding box that comprises a location of the gaze direction of the user.

20. The non-transitory computer-readable medium of claim 19, wherein identifying the object in the local area based on the determined gaze direction of the user comprises:

identifying one or more regions of the images of the local area captured by the one or more imaging devices as candidate objects;

identifying regions in a three-dimensional model of the local area corresponding to the candidate objects; and identifying the object corresponding to a candidate object within a region in the three-dimensional model of the local area to which the gaze direction of the user is directed.

* * * * *